(12) United States Patent
Hiley

(10) Patent No.: US 7,753,006 B2
(45) Date of Patent: Jul. 13, 2010

(54) TEAT APPLICATION DEVICE WITH CUP PORTION HAVING LIMITED CIRCUMFERENTIAL EXTENSION

(75) Inventor: Richard James Hiley, Oxfordshire (GB)

(73) Assignee: Ambic Equipment Limited, Witney (GB)

( * ) Notice: Subject to any disclaimer, the term of this patent is extended or adjusted under 35 U.S.C. 154(b) by 235 days.

(21) Appl. No.: 11/863,756

(22) Filed: Sep. 28, 2007

(65) Prior Publication Data

US 2009/0084324 A1    Apr. 2, 2009

(51) Int. Cl.
*A01K 29/00* (2006.01)
(52) U.S. Cl. ........................................ 119/673
(58) Field of Classification Search .............. 119/61.54, 119/673, 14.47; D30/158, 199; 604/300, 604/310; 222/108, 205, 207, 212
See application file for complete search history.

(56) References Cited

U.S. PATENT DOCUMENTS

| 3,366,111 | A | * | 1/1968 | Gandier | 604/310 |
| D348,129 | S | * | 6/1994 | Wolff | D32/53 |
| 5,379,724 | A | * | 1/1995 | Dee et al. | 119/673 |
| 5,535,700 | A |   | 7/1996 | Boudreau | |
| 5,722,350 | A | * | 3/1998 | Marshall | 119/673 |
| 5,845,807 | A | * | 12/1998 | De Villiers | 220/703 |
| 6,079,588 | A | * | 6/2000 | Khafizov | 220/711 |
| 7,165,510 | B2 |   | 1/2007 | Hakes | |
| 2002/0096541 | A1 | * | 7/2002 | Cross | 222/190 |
| 2005/0208148 | A1 |   | 9/2005 | Dahl | |
| 2006/0102095 | A1 |   | 5/2006 | Hakes | |
| 2006/0107904 | A1 |   | 5/2006 | Hakes | |
| 2008/0011241 | A1 | * | 1/2008 | Farina et al. | 119/673 |

FOREIGN PATENT DOCUMENTS

| EP | 0399132 B1 | 11/1990 |
| EP | 1224858 B1 | 1/2007 |
| GB | 2395435 B2 | 4/2005 |
| WO | WO2006033131 A1 | 3/2006 |

* cited by examiner

*Primary Examiner*—Kimberly S Smith
(74) *Attorney, Agent, or Firm*—Mark J. Rosen P.C.; Mark J. Rosen

(57) ABSTRACT

The present invention relates to an application device for treating the teats of milk producing animals with a liquid. The device comprises a dip cup with one or more reservoir chambers formed by a limited circumferential extension of the body of a cup portion of the dip cup to form one or more indentations on the inside of the cup portion.

11 Claims, 7 Drawing Sheets

TEAT APPLICATION DEVICE WITH CUP PORTION HAVING LIMITED CIRCUMFERENTIAL EXTENSION

FIELD OF THE INVENTION

The present invention relates to an application device for treating the teats of milk producing animals with a liquid. Typical milk producing animals that can be treated in this way are cows, sheep and goats.

BACKGROUND OF THE INVENTION

In order to maintain the health and welfare of milk producing animals, as well as their milk, it is very important that their udders and teats are kept clean and healthy. In particular, the bacteria that cause mastitis infections must not be allowed to proliferate and contaminate the milk harvesting equipment, thus risking the transfer of pathogens from animal to animal. To guard against this problem it is well known to treat the teats of animals with a liquid, such as a liquid disinfectant or a washing solution, either immediately before and/or immediately after milking. In the case of a pre-milking treatment application the aim is primarily to remove foreign matter and kill the bacteria present on the outside of the teat before milking. In the case of a post-milking treatment, it has been found beneficial to apply a sanitising solution and in some instances also a barrier liquid to provide a protective film that remains on the teat for some time and that seals and protects the teat end from mastitis causing bacteria. To ensure that such treatments are effective at controlling the bacteria, it is crucial that each teat is entirely coated with the liquid, and this requires the dairyman to maintain a high level of skill whilst operating the treatment process; unfortunately, for some methods of treatment this becomes arduous, especially in cases where the animal herd size is large.

In the prior art, spray bottles using a simple pump and trigger have been employed, as have more sophisticated systems such as those using vacuum operated automated spray devices, pumped spray delivery systems and back-pack spray type devices using a piston-type squeeze gun. In the latter two cases, the operator can vary the amount of liquid being applied and manually direct it to the udder and its depending teats. It is also known to treat teats with a liquid by dipping them into a rigid cup, commonly known as a "dip cup", filled with the liquid.

The term "dip cup" as used herein shall refer to the cup-shaped component of the application device that, in use, contains an amount of treatment liquid into which a teat is dipped. Commercially known dip cups, are made in one of two forms. Either they are made as a one-part component, for example machined from a single block of material, or they are made as a two-part component, having an inner cup shaped portion that is surrounded by an outer casing. The present invention encompasses both forms of dip cup, and because of this, the term "cup portion" as used herein, refers to the single-part component as a whole, as well as to the inner cup portion of the two-part component.

The dip cup method involves the use of an application device having a dip cup which is (in the case of the single-part component) or has (in the case of a two-part component) a cup portion with an open top end that extends along a body to a closed bottom end, that is partially filled with treatment liquid supplied from a reservoir source. This reservoir source may be remote from the dip cup, in which case the application device typically comprises a handheld wand or lance, one end of which is connected to the dip cup. The treatment liquid is conveyed from the remote source through a fluid flow tube associated with the wand or lance and into the cup portion. Alternatively, the reservoir source may be a rigid container that is connected with the closed bottom end of the cup portion. In both cases the liquid may be conveyed from the reservoir source using for example a vacuum-operated pump, a peristaltic pump, a stirrup pump or using compressed air. Any of the pumps used with the application device may be manually or electrically operated. Further alternatively, a flexible squeeze container that is connected to the bottom end of the dip cup may provide the reservoir source. In this latter case, when treatment liquid is required in the cup portion, the flexible squeeze container is manually squeezed and a supply of the treatment liquid is conveyed along a fluid flow tube to an outlet located within the cup portion. In this arrangement, the outlet is often located above the desired level of treatment liquid so that air (and not treatment liquid) is then sucked back along the fluid flow tube when the squeeze on the reservoir container is released.

To operate the dip cup method, the dairy farmer simply needs to introduce an appropriate quantity of treatment liquid into the cup portion of the dip cup using one of the above techniques and then position the filled dip cup under an animal's teat, raise the dip cup up to submerge the teat in the treatment liquid contained within the cup portion, then lower the dip cup and remove it from under the teat. This operation may be repeated on as many teats as required, and the amount of treatment liquid may be replenished to maintain the appropriate quantity in the cup portion of the dip cup.

As would be expected, when the teat is submerged, a portion of the treatment liquid is displaced, causing the level of liquid to rise within the cup portion. Clearly, if too much treatment liquid is used, it will be displaced so that it overflows out of the open top end of the dip cup. However, it is important that the level of liquid is sufficient to enable the whole of the teat to be submerged in the treatment liquid. Thus it is known to provide a dip cup whose cup portion has a full circumferential extension of the portion of its body adjacent to its open top end, to form wider ring-shaped portion adjacent the top open end of the cup portion. This wider ring effectively acts as an overflow area into which teat treatment liquid is displaced when the animal's teat enters the dip cup. If the cup portion is overfilled, and more chemical is dispensed than is required, the surplus chemical moves up into this wider ring area and the dip cup is prevented from overflowing.

European Patent 0 869 748 B1 discloses an alternative manually held apparatus that again includes a dip cup which contains an amount of a treatment liquid into which an animal teat is inserted. The characterising feature of this prior art is that this dip cup has an upper overflow chamber that includes a tapered conical wall for guiding a depending teat into the dip cup. The upper overflow chamber is formed by a clipped on plastic cover that is toroidal in shape and which fits over the open end of the dip cup. This upper overflow chamber is designed to receive treatment liquid displaced from the dip cup upon insertion of a teat. A drawback with this design of dip cup, however, is that the presence of the toroidal upper overflow chamber makes it very difficult to tip out contaminated or otherwise unwanted liquid from the cup without first removing the upper overflow chamber.

Another significant disadvantage of using such an upper overflow chamber is that this design tends to make the chemical in the cup portion of the dip cup more remote from the teat than is desirable—i.e. it extends the overall height of the dip cup and this means the teat has to be inserted a long way down into the cup portion of the dip cup before it comes into contact with fluid. A further disadvantage of using this upper overflow chamber is that it needs to be dismantled from the dip cup and cleaned after each milking to guard against contamination.

Therefore, it is highly desirable to make improvements in the design of dip cup application devices, for example, to provide a device that in addition to preventing displaced liquid overflowing from the dip cup upon insertion of a teat, it enables unwanted or contaminated liquid to be tipped out of the dip cup without the need for dismantling the application device first. Further, it is desirable to provide a device that can to be cleaned without dismantling the upper overflow chamber, and also to provide a device that ensures that the dip liquid is not out of the reach of the teat being treated. These and other problems are solved by the present invention.

SUMMARY OF THE INVENTION

The present invention concerns an application device for treating the teats of animals with a liquid. The device comprises a cup shaped portion and a supply of treatment liquid. The supply of treatment liquid may be achieved using any known means for example, as described above using a remote reservoir source or a reservoir source provided by a rigid or flexible container or bottle connected with the cup portion. Thus the present invention provides an application device for treating the teats of animals with a liquid, the device comprising i) a cup portion with an open first end capable of receiving an animal teat and extending along a body to a closed second end, ii) a supply of the liquid and iii) means for conveying the liquid into the cup portion; wherein the cup portion further comprises one or more reservoir chambers formed by a limited circumferential extension of the body to produce one or more indentations on the inside of the body of the cup portion. The one or more indentations can take the form of one or more dimples on the inside of the cup portion. The one or more indentations are advantageously designed to receive treatment liquid displaced from the dip cup upon insertion of a teat.

The application device of the present invention is preferably capable of being hung up in some way, to enable the operator (the dairyman) to put the application device down, for example, so that he can have both hands free perform another task, but still have the device within easy reach. It is common for an application device to be hung from the operator's belt, and often application devices are provided with an attachment means such as a hook or a ring to enable this. Alternatively, it is known, especially in the case of dip cups with a fluid flow tube to connect the device to the remote source of treatment liquid, for the application device to be hung up by the fluid flow tube and be allowed to dangle therefrom. However, when a known application device is in its "hung" or "dangled" position, the open first end of its cup portion is oriented on its side and any liquid within the dip cup is then free to spill out. Hence, in respect of prior art dip cups, it is necessary to ensure the cup portion is empty before attempting to hang the device up. Fortunately, the application device of the present invention does not suffer from this problem. In the case of the present invention, the operator is able to fill the cup portion to a level ready for use and then hang the application device up without fear of the liquid then spilling out. The one or more reservoir chambers of the present invention, formed by a limited circumferential extension of the body to produce one or more indentations on the inside of the cup portion are designed to receive the portion of the liquid that would otherwise spill out when device is hung up with the open first end of the cup portion is oriented on its side. Preferably, the one or more reservoir chambers are located in a section of the inside of the cup portion that is in the path of the liquid that would spill out (if such reservoir chambers were not present) when the cup portion is oriented on its side.

The reservoir chambers of the present invention also provide the advantage that contaminated or otherwise unwanted liquid can easily be removed from the cup portion, without the need for dismantling the application device first. To achieve this, the application device of the present invention is simply turned over to orient the cup portion upside down and the unwanted liquid is tipped out of the open first end of the cup portion.

Moreover, the reservoir chambers of the present invention also provide the advantage that the device can be easily cleaned without the need for dismantling the application device first. Further moreover, the design and position of the reservoir chambers used in the application device of the present invention do not cause the overall height of the dip cup to be extended, thus the teat being dipped is not out of reach of the treatment liquid.

Furthermore, the provision of one or more reservoir chambers according to the present invention prevents spillage when the dip cup is being used to dip the teats of cows for example in milking systems involving stanchion barns or the like, where the operator is not located in a pit below the cow, or when the dip cup is being used to dip the teats of small milk producing animals such as goats and sheep where there is less room to position the application device. In such situations it is highly desirable for the operator if he does not need to bend down quite so far to reach the teats. Therefore, it is preferable to use either an application device of the type that has a container reservoir source connected with the dip cup and where the dip cup is tilted on its side at an angle to its upright position, or to use an application device that has a remote reservoir source of treatment liquid that is supplied to the dip cup via a wand or lance. Without the reservoir chambers of the present invention, any attempt to stand up an application device with a tilted dip cup, or hang up a dip cup connected to a lance, when the dip cup contains an appropriate amount of treatment liquid, will result in the treatment liquid overflowing out of the cup portion. The presence of the one or more reservoir chambers in accordance with the present inventions, however, allows the treatment liquid that would otherwise spill out if the reservoir chambers were not present, to be contained. Thus, the present invention prevents overflow of treatment liquid in application devices that have an angled dip cup or which involve the dip cup being connected to a lance.

In a first embodiment, the present invention provides an application device as described above, wherein at least one of the reservoir chambers is in the form of an elongate channel that extends along the body of the cup portion from its open first end towards its closed second end, wherein the channel is formed as an indentation on the inside of the cup portion. Preferably, the above-mentioned elongate channel extends vertically along the body of the cup portion.

In a second embodiment of the present invention, two elongate channels of the type described above are provided on the inside of the cup portion. Preferably the two elongate channels are provided on opposing sides on the inside of the cup portion.

In a third embodiment, the one or more elongate channels taper inwards at their end closest to the closed second end of the cup portion such that they are generally "V" shaped.

In a fourth embodiment, the present invention provides an application device as described above wherein at least one of the reservoir chambers is in the form of an indentation that extends generally horizontally along the body of the inside of the cup portion.

Preferably the application device according to the present invention has means for conveying the liquid comprising one or more fluid flow tubes to transport the liquid from the supply of liquid to the cup portion of the dip cup, wherein one end of each of the one or more fluid flow tubes is connected to the supply of the liquid and the other end of each is connected to a liquid outlet that is positioned at a desired location within the cup portion. It is preferable to use two or more fluid flow tubes to reduce the amount of work needed to supply the liquid to the cup portion of the dip cup. This is especially advantageous when transporting liquid with a high viscosity such as a barrier liquid. An application device with two or more fluid flow tubes may be converted for use to apply a liquid of lower viscosity by simply blocking off the unneeded fluid flow tubes.

It is preferable that the one or more liquid outlets are located close to the open first end of the cup portion.

It is envisaged that the supply of the liquid can be achieved using one of a number of different ways. For example, in one application device according to the present invention the supply of liquid may be provided by a manually squeezable flexible reservoir container, which is connected to the dip cup. One or more fluid flow tubes as described above may be used to convey the liquid from the manually squeezable flexible reservoir container to the cup portion of the dip cup. Thus, in use, liquid is transferred from the reservoir container into the cup portion of the dip cup by manually squeezing the flexible reservoir container to force liquid within it along the one or more fluid flow tubes and out of one or more liquid outlets positioned within the cup portion.

In another application device according to the present invention the supply of liquid may be contained in a rigid reservoir container that is connected to the dip cup. In this arrangement, the liquid is conveyed from the reservoir container into the dip cup via fluid flow tubes and the liquid is caused to flow along these fluid flow tubes using a device such as a peristaltic fluid pump, a vacuum operated pump, a stirrup pump or using compressed air.

In a further application device according to the invention the supply of liquid may be provided by a liquid supply tank that is remote from the dip cup and fluidly connected with it via fluid flow tubes. The liquid is caused to flow along the fluid flow tubes from the liquid supply tank to the dip cup using a device such as a peristaltic fluid pump, a stirrup pump, a vacuum operated pump or using compressed air.

Thus the present invention provides an application device for treating the teats of animals with a liquid, the device comprising i) a cup shaped portion and ii) liquid supply means comprising a) means of withdrawing the liquid from the liquid supply means, b) means of delivering the liquid into the cup portion and c) means of controlling the amount of liquid delivered to the cup portion; wherein the cup portion has an open first end capable of receiving an animal teat and extending along a body to a closed second end and wherein the cup portion further comprises one or more reservoir chambers formed by a limited circumferential extension of the body to produce one or more indentations on the inside of the cup portion.

Examples of the means of withdrawing the liquid from the liquid supply means include, use of a manually squeezable flexible reservoir container, and use of a manually or electrically operated device such as a vacuum operated pump, a peristaltic pump, a stirrup pump, or using compressed air.

The means of delivering the liquid into the cup portion of the dip cup may conveniently include one or more fluid flow tubes. The means of controlling the amount of liquid delivered to the cup portion can include the regulation of the squeezing action on the manually squeezable flexible reservoir container or a manually operable handle connected with the liquid supply means. Suitably, such a manually operable handle has a valve to control the flow of the liquid from the liquid supply means to the cup portion, which valve is movable between open and closed positions to permit and stop, respectively, the flow of the liquid. Preferably, the valve is moveable between open and closed positions using a manually operable lever associated with the handle.

DETAILED DESCRIPTION

Figure 1:
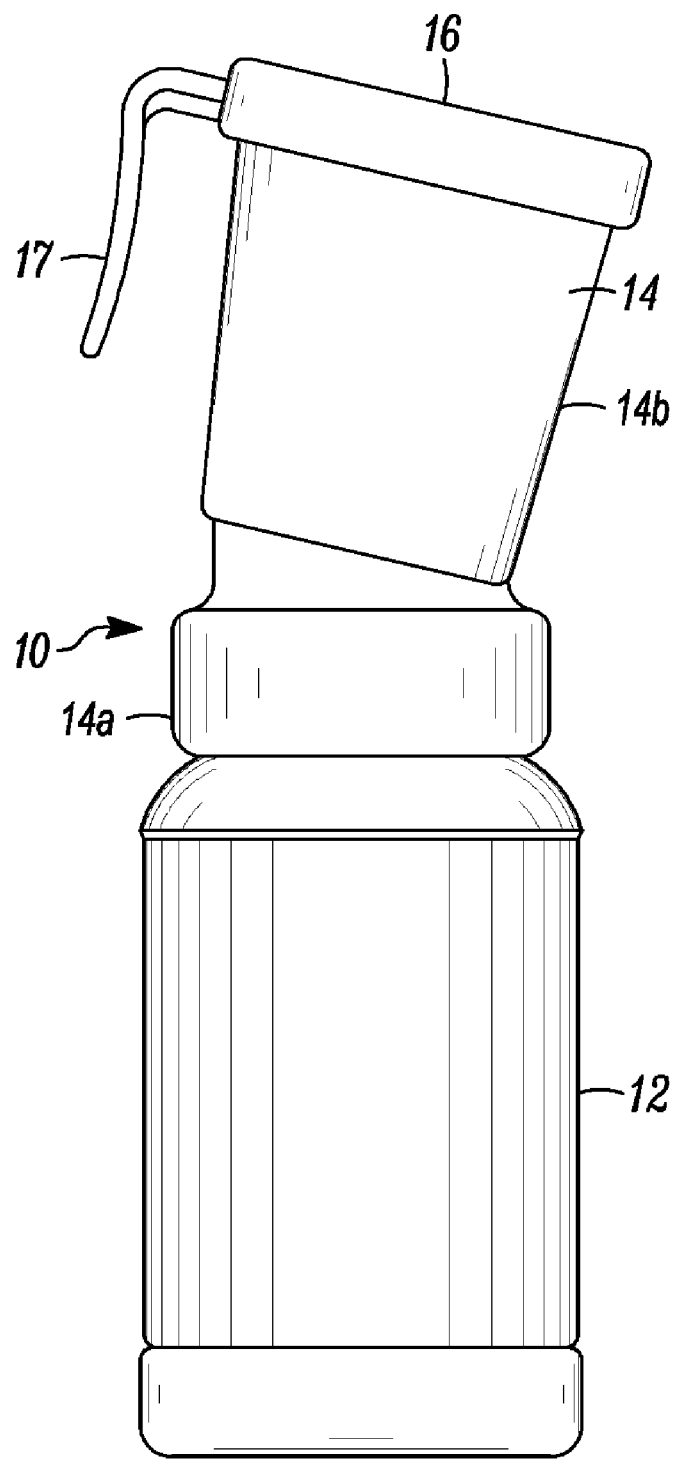
FIG. 1 is a side perspective view of an application device according to the present invention.

FIG. 1 shows an application device 10 that comprises a container in the form of an open top flexible squeeze bottle 12, and a plastics dip cup 14. The dip cup 14 has a generally cylindrical base portion 14a which threadably engages with the open end of the bottle 12 and an upper, generally frustoconical body portion 14b which is inclined at a small angle with respect to the base portion 14a. The dip cup 14 also has an open first end 16 capable of receiving an animal teat, and a hook 17 which may be used when the device is in use to hang the application device up to allow the operator to have both hands free to perform another task.

Figure 2:
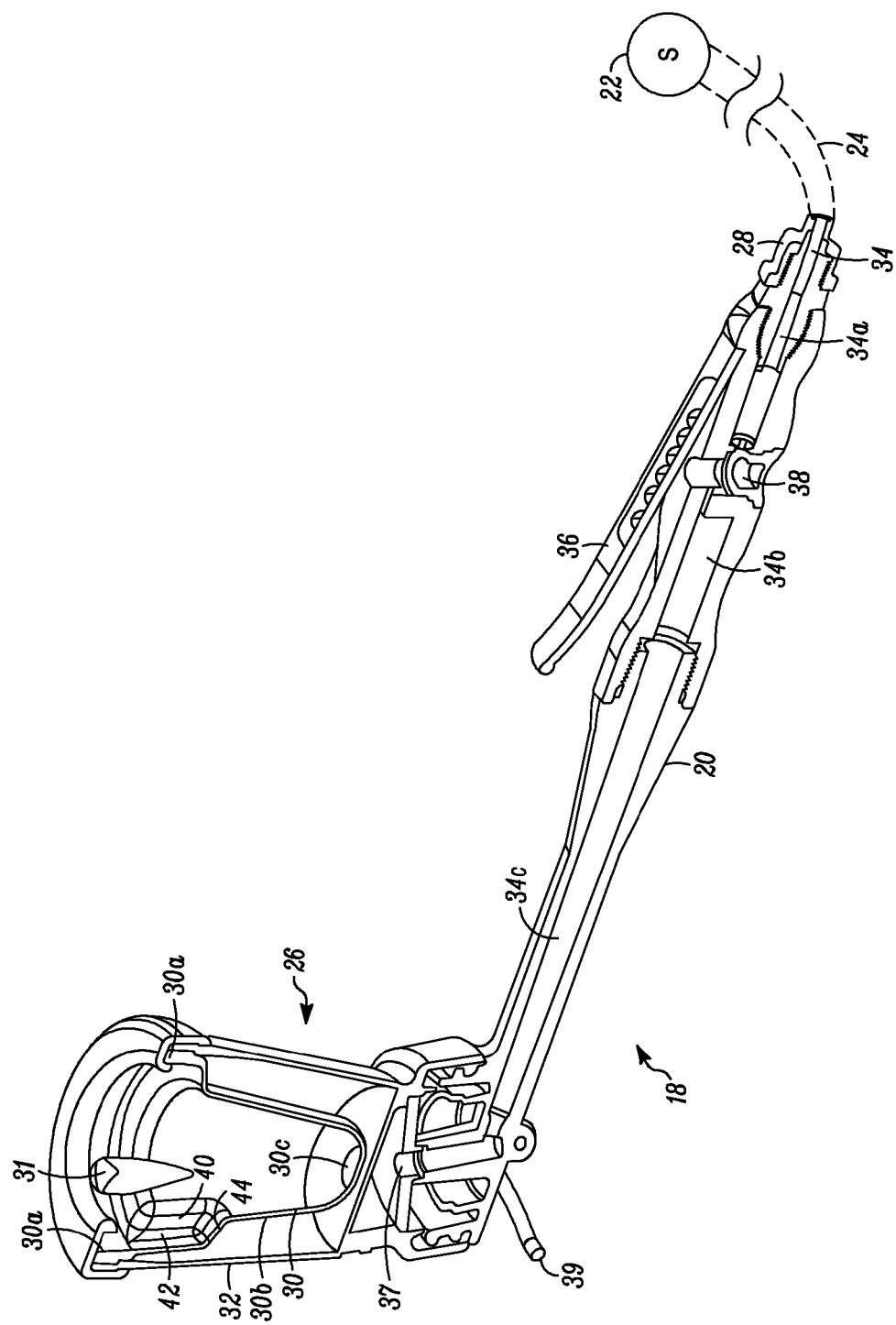
FIG. 2 is a sectional view of an application device alternative to that shown in FIG. 1.

The alternative application device 18 shown in FIG. 2 includes a manually operable wand-like handle 20, one end of which is supplied with a source 22 of liquid via a flexible hose 24. The flexible hose 24 is connected to the handle 20 using a hose connector 28. The other end of the handle 20 is connected to a dip cup 26, which is similar to the dip cup 14 shown in FIG. 1. The dip cup 26 comprises an inner cup portion 30, which has an outer casing 32. The inner cup portion 30 has an open first end 30a that extends along a body 30b to a closed second end 30c. A full circumferential extension of the body 30b forms a full annular extension 30d of the inner cup portion 30 adjacent the open first end 30a. The open first end 30a is capable of receiving an animal teat. A fluid flow path 34 is formed within the wand-like handle 20 and extends from the connection 28 with the flexible hose 24 along internal channels 34a, 34b and 34c within handle 20 to an aperture 37 in the base of the outer casing 32. The handle 20 also has a manually operable lever 36 that is capable of being pressed down to open a valve 38. A hook 39 is provided on the handle to enable the application device to be hung up.

The inner cup portion 30 as shown in FIG. 2 has an over flow chamber 40 formed by an elongate channel 42 that extends part way along the body 30b of the inner cup portion 30 from its open first end 30a towards its closed second end 30c. The base 44 of the elongate channel 42 is inclined at a slight angle to the plane of the open first end 30a.

Figure 2A:
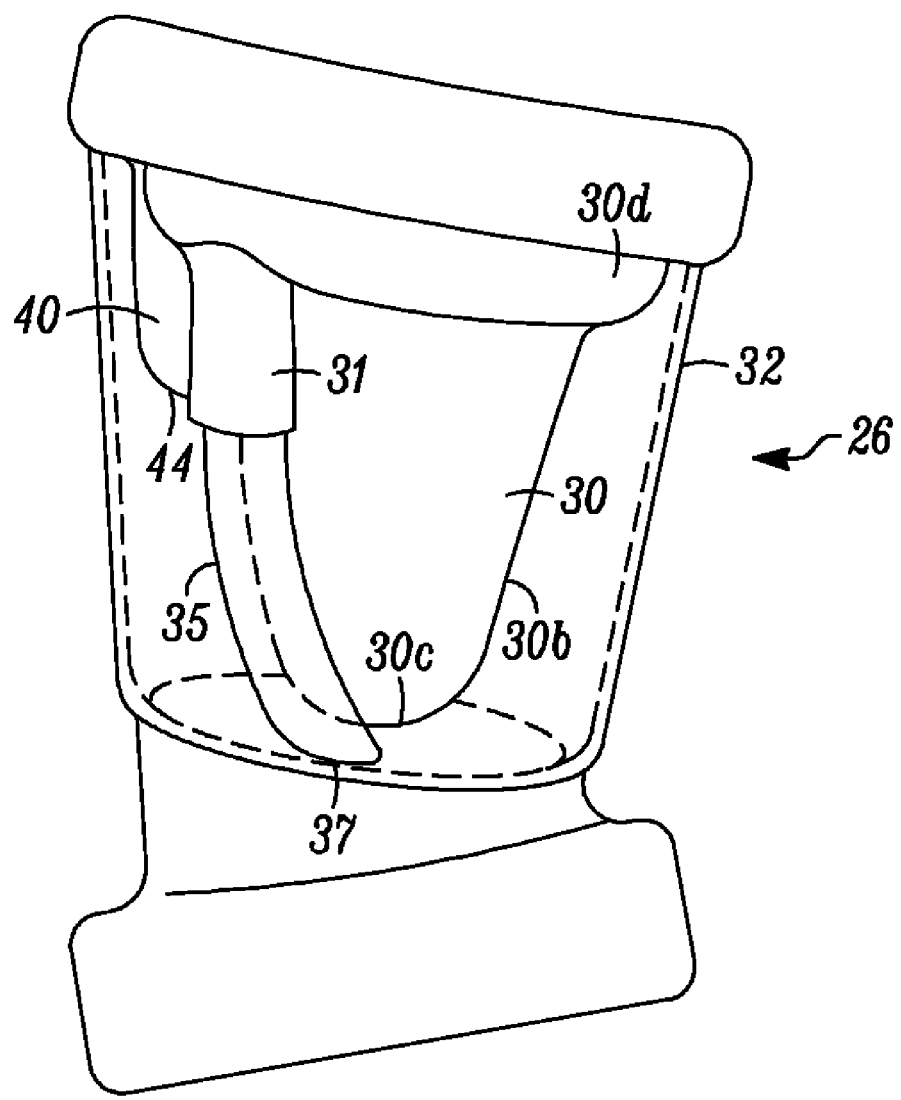
FIG. 2A is a cut away side view of the dip cup portion of the application device shown in FIG. 2.

FIG. 2A shows the dip cup 26 of FIG. 2 in closer detail by showing the outer casing 32 cut away. FIG. 2A reveals that a tube 35, fits within the aperture 37 in the base of the outer casing 32 to form a flow path that connects the outlet nozzle 31 to the fluid flow path 34.

In use, the treatment liquid under pressure (either using a pump or compressed air) is introduced to the cup portion 30 by manually pressing down the lever 36 to open valve 38 and thereby to allow the treatment liquid to flow from the source 22 along the flexible hose 24, along the internal channels 34a, 34b and 34c within the handle 20, through the tube 35, through outlet nozzle 31 and into the inner cup portion 30. When sufficient treatment liquid is in the cup portion, the operator depresses the lever 36 to cause the valve 38 to close and thereby shut off the supply of liquid. The operator may then choose to hang up the filled application device, thereby causing the cup portion 30 to be oriented on its side. The presence of the overflow chamber 40 in the cup portion 30 to contain the liquid within the cup portion 30 allows this to be achieved without the liquid within the cup portion 30 from spilling out.

Figure 3:
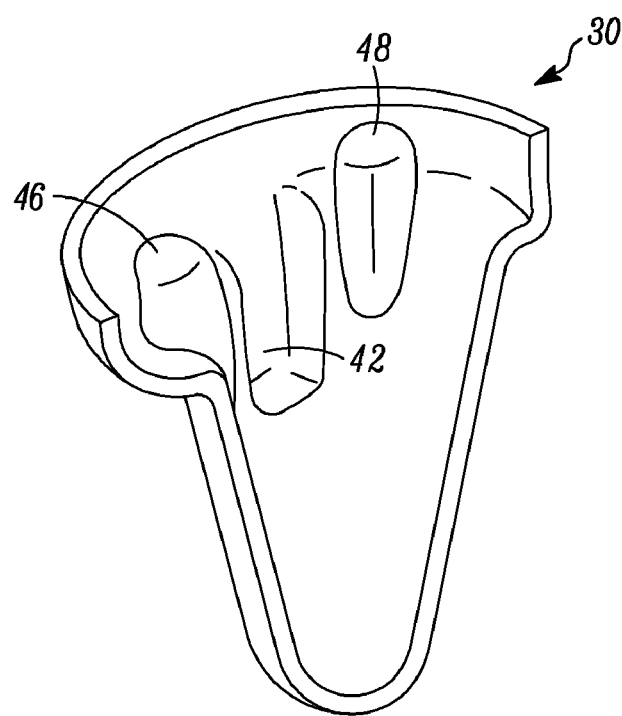
FIG. 3 is a cut away perspective view of a dip cup portion used in an application device according to the present invention.

FIG. 3 shows a cut away perspective view of the inner cup portion 30 of FIG. 2. Two outlet nozzles 46, 48 are located on either side of the elongate channel 42.

Figure 4:
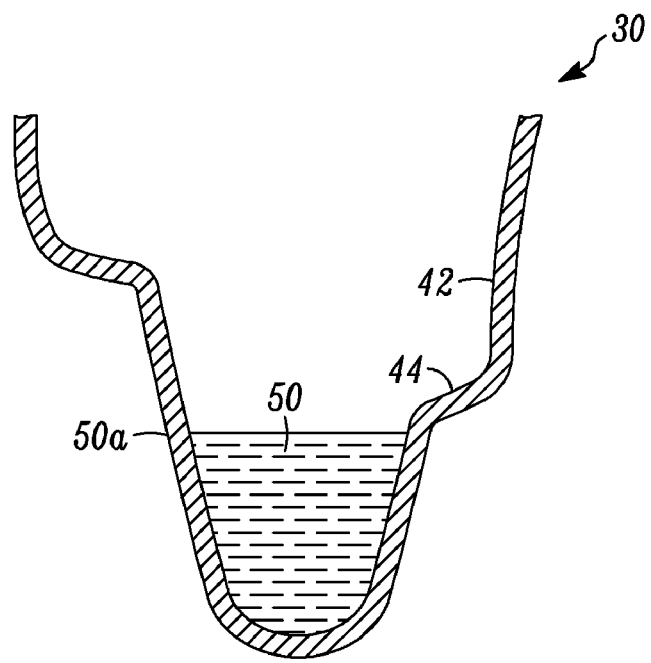
FIG. 4 is a cross-sectional view of a dip cup portion used in an application device according to the present invention showing the level of liquid when the device is in its upright position.

FIG. 4 shows a cross-sectional view of the inner cup portion 30 of FIG. 2 with liquid 50 being present at a level 50a within the inner cup portion 30 that is suitable for dipping an animal teat. The level 50a is just below the base 44 of the elongate channel 42.

Figure 5:
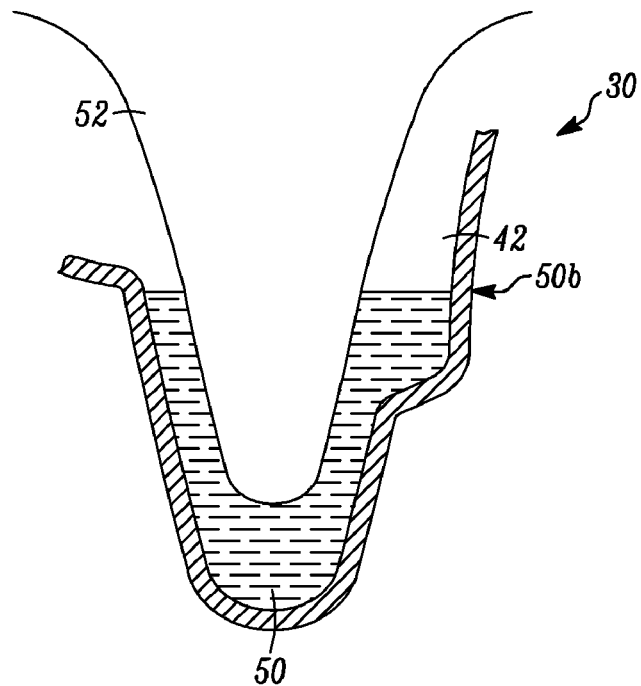
FIG. 5 is a cross-sectional view of a dip cup portion used in an application device according to the present invention showing the level of liquid displaced into the reservoir chamber when a teat is inserted into the cup portion.

FIG. 5 shows a cross-sectional view of the inner cup portion 30 of FIG. 2 with an animal teat 52 being dipped into the liquid 50. A portion of the liquid 50 is shown as being displaced into the elongate channel 42 to level 50b.

Figure 6:
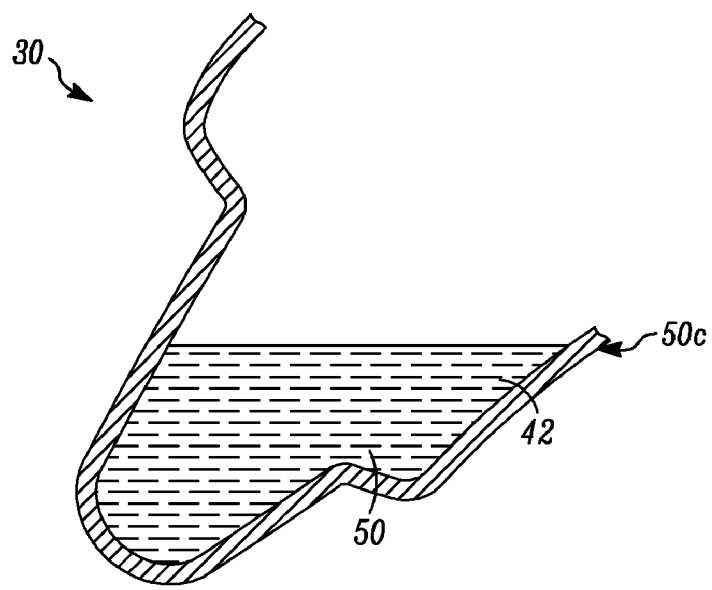
FIG. 6 is a cross-sectional view of a dip cup portion used in an application device according to the present invention showing how the level of liquid is displaced into the reservoir chamber when a dip cup that is ready for use, is hung up.

FIG. 6 shows a cross-sectional view of the inner cup portion 30 of FIG. 3 oriented on its side. Such an orientation will occur when the application device 10, 18 is hung up. A portion of liquid 50, greater than that shown in FIG. 5 is shown as being displaced into the elongate channel 42 to level 50c.

Figure 7:
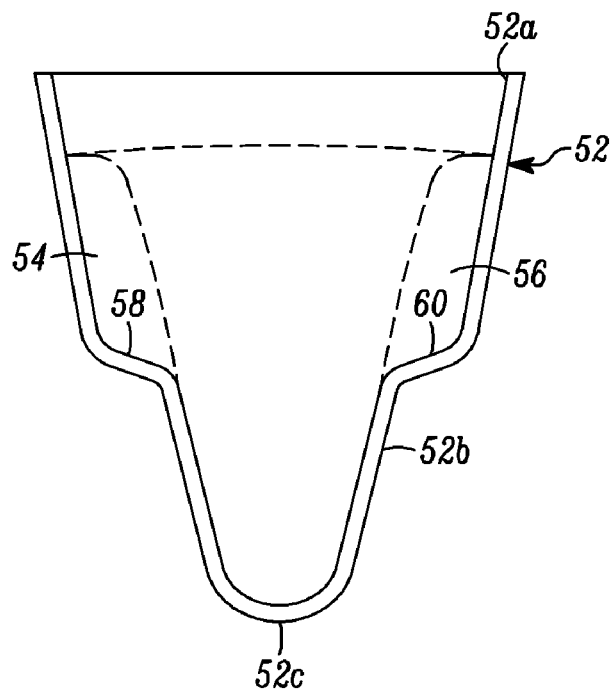
FIG. 7 is a cross-sectional view of a cup portion used in a second embodiment of the application device according to the present invention.
Figure 8:
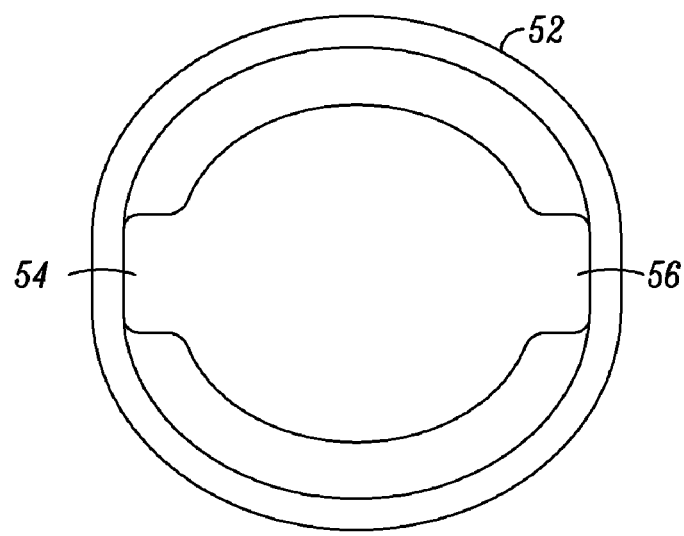
FIG. 8 is a plan view of the top of the dip cup portion shown in FIG. 7.

Referring to FIGS. 7 and 8, an inner cup portion 52 having two elongate channels 54, 56 is shown. As with the elongate channel 42 shown in FIG. 2, the elongate channels 54, 56 extend part way along the body 52b of the inner cup portion 52 from its open first end 52a towards its closed second end 52c. Also as with the elongate channel 42, channels 54, 56 each have a base 58, 60 respectively, that is inclined at a slight angle to the plane of the open first end 52a. The purpose of having two elongate channels 54 and 56 is to allow the same dip cup to be used in the device such as that shown in FIG. 2, no matter whether it is hung up by a hook 39, or allowed to dangle down from hose 24. It will be appreciated that the overflow channel will need to be on opposite sides of the dip cup depending upon the chosen hanging orientation.

Figure 9:
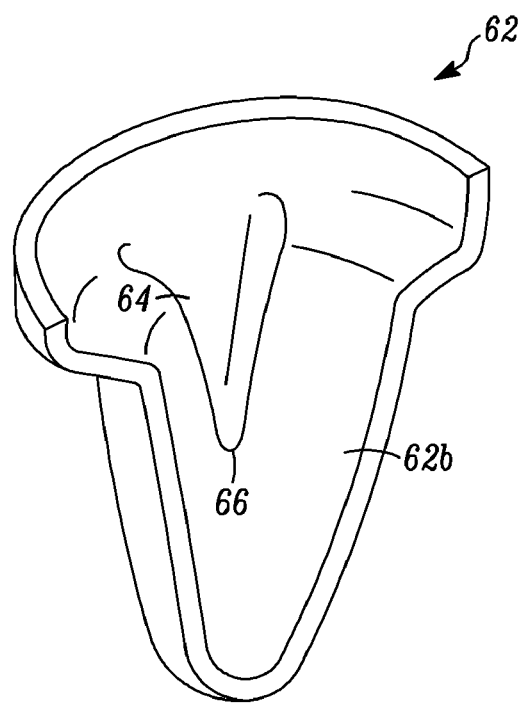
FIG. 9 is a cut away perspective view of a dip cup portion used in an application device according to a third embodiment of the present invention.

FIG. 9 shows an inner cup portion 62 that has a reservoir chamber in the form of an elongate channel 64 that inwardly tapers to a point 66 as it extends along the body 62b of the inner cup portion 62.

Figure 10:
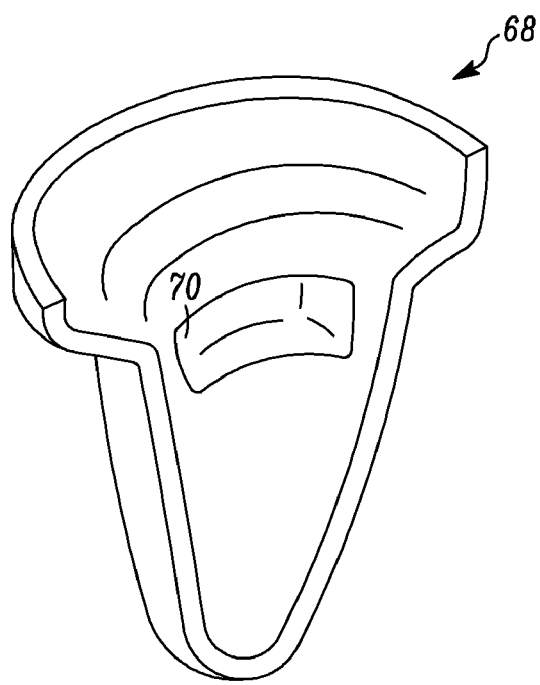
FIG. 10 is a cut away perspective view of a dip cup portion used in an application device according to a fourth embodiment of the present invention.

FIG. 10 shows an inner cup portion 68 that has a reservoir chamber in the form of a generally horizontally extending indentation 70 on the inside of the cup portion 68.

I claim:

1. An application device for treating the teats of animals with a liquid, the device comprising i) a cup portion with an open first end capable of receiving an animal teat and extending along a body to a closed second end, ii) a supply of the liquid and iii) means for conveying the liquid into the cup portion; wherein the cup further comprises one or more reservoir chambers formed by a limited circumferential extension of the body to produce one or more indentations on the inside of the cup portion, and whereby the device is capable of both vertical and non-vertical treatments.

2. An application device according to claim 1 having one or more reservoir chambers formed by a limited circumferential extension of the body, at least one of the reservoir chambers being in the form of an elongate channel that extends along the body of the cup portion from its open first end towards its closed second end and wherein the one or more elongate channels are formed as indentations on the inside of the cup portion.

3. An application device according to claim 2 wherein the elongate channel extends generally vertically along the body of the cup portion.

4. An application device according to claim 2, comprising two elongate channels on the inside of the cup portion.

5. An application device according to claim 2 wherein the one or more elongate channels taper inwards at their ends closest to the closed second end of the cup portion.

6. An application device according to claim 1 wherein at least one of the reservoir chambers is in the form of an indentation that extends generally horizontally along the body of the inside of the cup portion.

7. An application device according to claim 1 wherein the means for conveying the liquid comprises one or more fluid flow tubes to transport the liquid from the supply of liquid into the cup portion, wherein one end of each of the one or more fluid flow tubes is connected to the supply of the liquid and the other end is connected to a liquid outlet that is positioned at a desired location within the cup portion.

8. An application device according to claim 7 wherein at least one of the one or more liquid outlets is located close to the open first end of the cup portion.

9. An application device according to claim 1 wherein the supply of liquid is provided by a liquid supply tank that is remote from the cup portion and fluidly connected with the cup portion via the one or more fluid flow tubes.

10. An application device according to claim 1 wherein the supply of liquid is provided by a reservoir container that is connected with the cup portion.

11. An application device for treating the teats of animals with a liquid, the device comprising i) a cup portion and ii) liquid supply means comprising a) means of withdrawing the liquid from the liquid supply means, b) means of delivering the liquid into the cup portion and c) means of controlling the amount of liquid delivered to the cup portion; wherein the cup portion has an open first end capable of receiving an animal teat and extending along a body to a closed second end and wherein the cup portion further comprises one or more reservoir chambers formed by a limited circumferential extension of the body to produce one or more indentations on the inside of the cup portion, and whereby the device is capable of both vertical and non-vertical treatments.

* * * * *